S. HULL.

Harvester.

No. 1,466. Reissued April 28, 1863.

Witnesses
Gustavus Sohnrich
R. T. Campbell

Inventor
Stephen Hull
by
Mason Fenwick & Lawrence
his atty's.

N. PETERS, Photo-Lithographer, Washington, D. C.

UNITED STATES PATENT OFFICE.

STEPHEN HULL, OF POUGHKEEPSIE, NEW YORK, ASSIGNOR TO HIMSELF AND WM. VAN ANDEN.

IMPROVEMENT IN HARVESTERS.

Specification forming part of Letters Patent No. 22,077, dated November 16, 1858; Reissue No. 1,466, dated April 28, 1863.

*To all whom it may concern:*

Be it known that I, STEPHEN HULL, of Poughkeepsie, in the county of Dutchess and State of New York, have invented a new and useful Improvement in Harvesting-Machines; and I do hereby declare that the following is a full, clear, and exact description thereof, reference being had to the accompanying drawings, making a part of this specification, in which—

Figure 1:
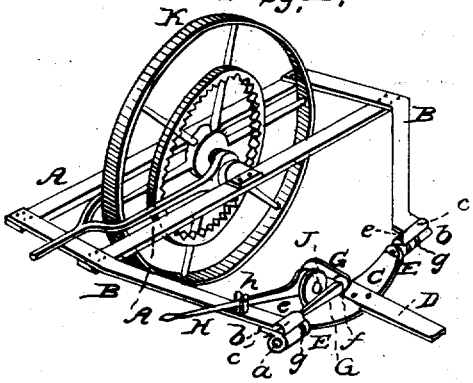
Figure 2:
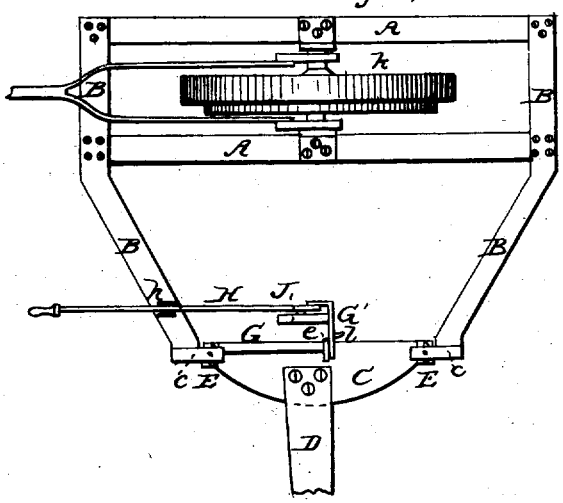
Figure 3:
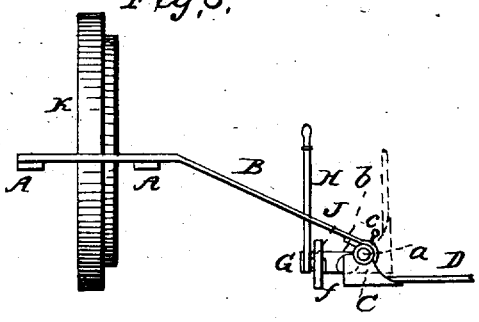
Figure 5:
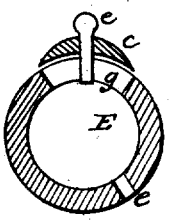
Figure 4:
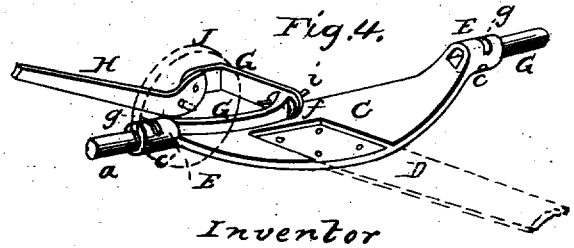

Figure 1 is a perspective view of my invention with the cutting apparatus removed. Fig. 2 is a plan view of Fig. 1. Fig. 3 is an end elevation of Fig. 2, showing the finger-bar in two positions. Fig. 4 is a perspective view of the side swinging portion of the main frame, detached from the machine. Fig. 5 is a transverse section of one of the slotted boxes of Fig. 4 and a portion of the perforated flange which projects over the same.

Similar letters of reference indicate corresponding parts in the several figures.

First, the nature of my invention consists in constructing the main or draft frame of the machine in such a manner that one of its longitudinal portions constitutes a rocking brace, beam, or shoe, and a support for the cutting apparatus, and while it allows the finger-beam to float on the ground and accommodate itself to the unequal surface, also admits of the entire cutting apparatus being thrown back out of gear and out of the way when it is desired to transport the machine from one place to another, all as will be hereinafter described; secondly, in inclining or depressing the transverse projecting braces of the main frame so as to bring the longitudinal rocking brace, beam, or shoe on or near the ground, and in so curving this brace, beam, or shoe that while it serves as the fulcrum and support for the finger-beam its axis of motion can be placed so high as that it will not be liable to gather the grass, but to pass freely over the cut grass and other obstructions, whether the finger-bar is down on the ground or whether it be turned up for moving the machine about from place to place, as will be hereinafter described; thirdly, in a novel arrangement for allowing the finger-bar to rise and fall and accommodate itself to the inequalities of the surface of the ground and controlling this motion so that the finger-bar will not rise so high nor fall so low as to affect the motions of the connecting-rod, as will be hereinafter described; fourthly, in supporting the depressed side of the main frame of the machine upon a small wheel, which is so applied with the hinged brace, beam, or shoe that it will maintain its vertical position when the finger-beam is thrown up and form a side support for the frame of the machine whether the finger-beam be on the ground or in an elevated position, as will be hereinafter described.

To enable others skilled in the art to make and use my invention, I will proceed to describe its construction and operation.

The main frame of my harvester consists of two longitudinal and parallel beams, A A, which are properly framed and bolted to the transverse beams B B. These latter project out from one side of the longitudinal beams A A a suitable distance to give room for the introduction of the gearing and connecting-rod which operate the sickle, and are inclined downward and toward each other, as shown in Figs. 1, 2, and 3 of the drawings. The outer converging ends of the beams B B are connected together by means of a longitudinal brace, beam, or shoe, C, which supports the finger-bar D. The brace, beam, or shoe C is connected to the outer ends of the beams B B by means of the gudgeons *a a* and pins *e e*, which are formed on its outer ends, as shown in Fig. 4 of the drawings, which have their bearings in the fixed eyes *b b*. This connection will allow the brace, beam, or shoe C, with its finger-bar D, to rock in the bearings *b b*, and the finger-bar D may thus be thrown up against the side of the frame or allowed to float on the surface of the ground and accomodate itself to the inequalities of the surface. The brace, beam, or shoe C is curved, so that its pivoted ends will be at some distance from the ground, while its lowermost surface may be very near to or on the ground. The object of this is to prevent this brace, beam, or shoe C from offering any obstruction to the forward movement of the machine, and at the same time to keep the finger-bar near enough to the surface of the ground to perform its work properly.

Near each end of the brace, beam, or shoe C is a slotted box, E, which is fixed to this brace, beam, or shoe and moves with it, and projecting from each end of the depressed portions of the beams B B is a flange, *c*, which projects over its respective box E, and has a hole punched vertically through it for allowing a bolt-pin, *e*, to be dropped down into the oblong slot *g*, which is made transversely across each one of the boxes E, as shown in Figs. 1, 2, and 4. These slots are of sufficient length to allow the finger-bar to have all the motion it is desired, and the pins *e e* prevent the finger-bar from rising or falling too far, and also convert the beam-shoe C into a brace to the draft-frame and the cutting apparatus. The holes *e′ e′* receive the pins *e e* when the finger-bar is thrown back on the frame out of use and lock the parts in this position.

G is a rib, which carries on its end a circular plate, *f*, which forms the pivot-bearing for the angular support G to allow this plate to preserve its horizontal position when the finger-bar D is turned up. H is a lever, which is pivoted at its forward end to the support G, and which carries the wheel J for supporting the outer end of the frame of the machine, and as it is desired that this wheel shall support the frame not only when the finger-bar D is on the ground but when this finger-bar is thrown up and the cutting apparatus is out of action, I introduce a pin, *i*, through the angular plate G′ and the circular portion *f*, which fixes the plate G′ to the brace, beam, or shoe C, when the machine is in working condition and the finger-bar on the ground; but when it is desired to raise the finger-bar up for moving the machine from one field to another this pin *i* is removed, and the wheel will then remain in a vertical position and support the outer end of the frame to which it is applied.

The lever H, which carries the wheel J, extends back, and may be connected by means of a loose pin to the standards *h* on the rear beam, B, and by removing the pin and setting it higher or lower the outer end of the frame of the machine, together with the cutting apparatus which it carries, may be adjusted for cutting high or low grass. The axis of motion of the short right-angular piece which carries the lever H and wheel J is nearly in a line with the axis of the curved brace, beam, or shoe C, so that when the pin *i* is removed and the finger-bar thrown back the wheel J will remain in its perpendicular position with the ground, on which it rests. This wheel is also arranged so that its axis is in or nearly in the vertical plane of the axis of the large driving-wheel K, on which the frame A B and the brace, beam, or shoe C rests. Thus the small wheel will not be dragged over the ground in turning the machine round; but it will follow in the plane of the large wheel and roll smoothly over the ground.

From the above description it will be seen that the draft-frame must be depressed on an incline or curve in order to have the brace, beam, or shoe hinged to it without the aid of an intermediate frame or coupling arrangement, as represented in the drawings.

The gist of my invention lies—

First. In dispensing, in that class of machines which have a hinged folding finger-beam, with the auxiliary coupling or supporting frame, with the usual side beam, to support this frame and the shoe. This I accomplish by using in lieu thereof a brace, beam, or shoe which fulfills the office of a brace to the draft-frame and of a shoe and support to the cutting apparatus, and still does not stand in the way when the cutting apparatus is required to be thrown up, but serves as the hinge or fulcrumed axis for it to turn upon.

Second. In having the brace, beam, or shoe bowed downward, so that it comes close to the ground while the cutting apparatus is operating in grain; but when the cutting apparatus is thrown up it stands high enough to clear stones, cut grass, and other obstacles.

Third. In combining in one axis or hinge connection the advantage of being able to throw the cutting apparatus up against the side of the machine while transporting the machine from place to place, and also of allowing it to float and rise or fall only to a proper degree while cutting the grain or grass.

Having thus described my invention, what I claim as new, and desire to secure by Letters Patent, is—

1. Providing a free opening between the rear inner depressed extensions, B B, of the draft-frame and hinging within the same a shoe or support for the cutting apparatus, substantially as and for the purposes set forth.

2. In combination with a cutting apparatus which is arranged to rise and fall to a governed extent at its outer end, and also to be adjusted against the side of the machine or out of operative position, substantially as described, a small supporting-wheel so arranged with respect to the cutting apparatus and the one large supporting-wheel that it sustains the cutting apparatus at its inner end when the machine is cutting grass, and also acts, in combination with the one large supporting-wheel, to sustain the inner side of the draft-frame when the cutting apparatus is thrown up out of operation, substantially as herein described.

3. Combining in a single rocking shoe, C, the advantages of controlling the extent of vibration of the cutting apparatus when the machine is in operation, and also of securing the cutting apparatus in place when it is thrown up out of action, by means substantially as described.

4. Hinging or pivoting a shoe or support for the cutting apparatus of a harvesting-machine directly to the depressed ends of the transverse beams thereof, substantially in the manner and for the purposes herein described.

5. The small supporting-wheel J, so applied to the extended frame of the machine and with the brace, beam, or shoe that it will preserve its perpendicular position whether the finger-bar be on the ground or thrown up against the machine, substantially as herein described.

STEPHEN HULL.

Witnesses:
A. M. BRUSH,
R. ROBERTSON.